Dec. 30, 1941. R. P. GRAYSON 2,267,910
POWER PRODUCING APPARATUS
Filed Nov. 25, 1939 5 Sheets-Sheet 1
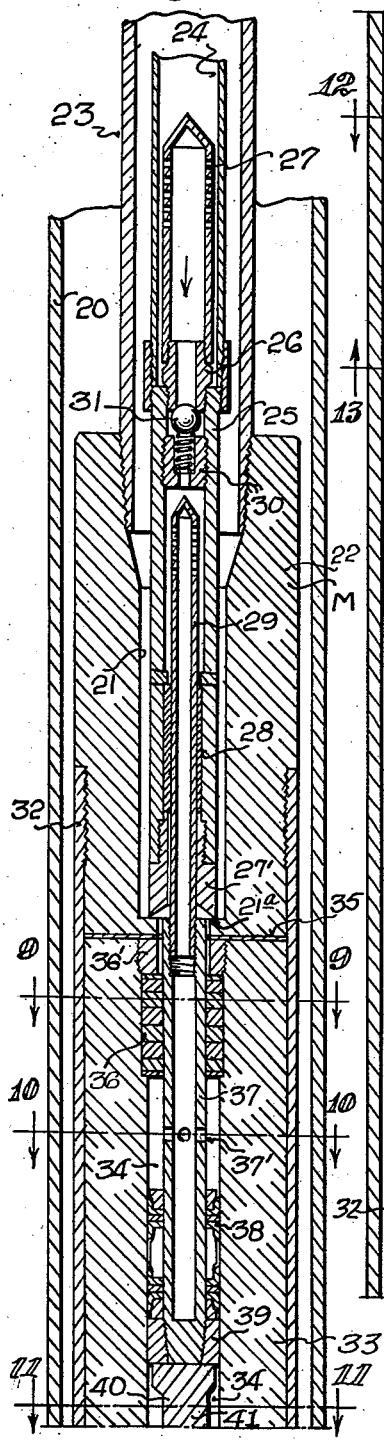
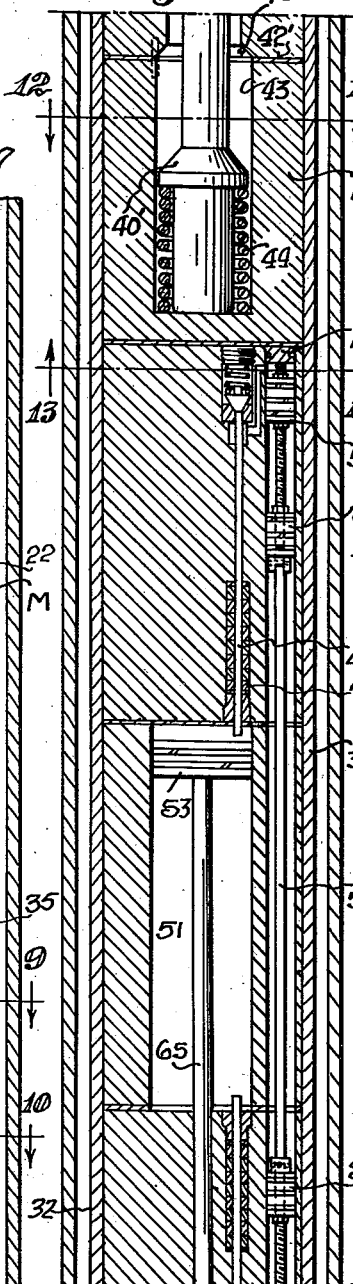
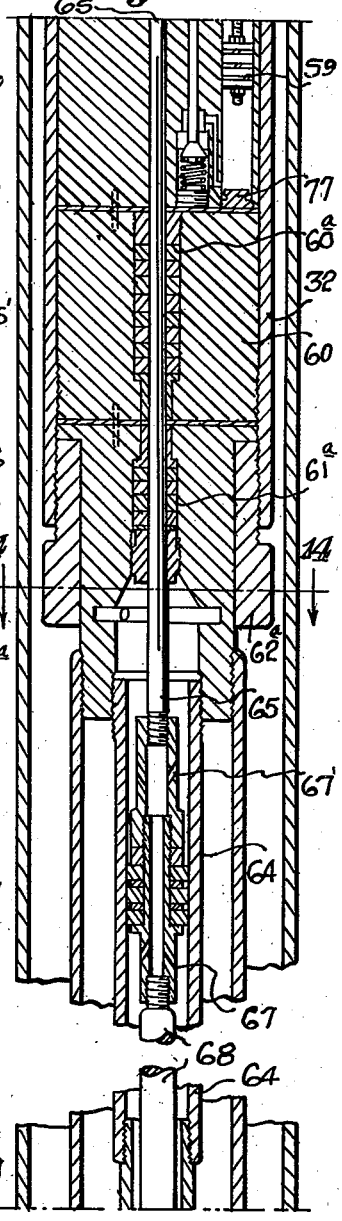
R. P. Grayson
INVENTOR.
BY
ATTORNEY.

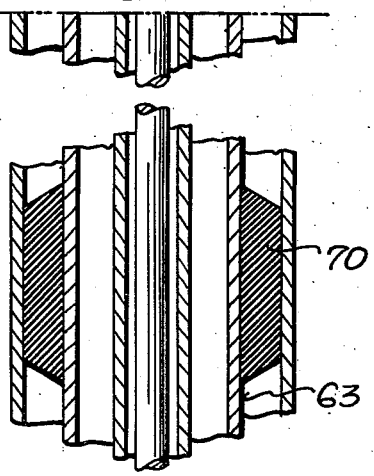
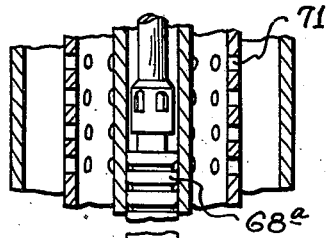
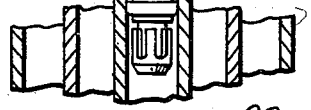
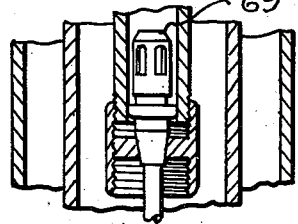
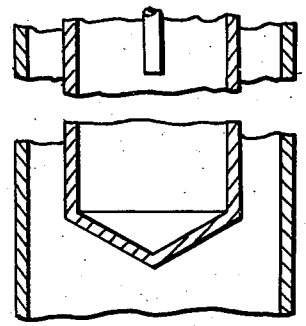
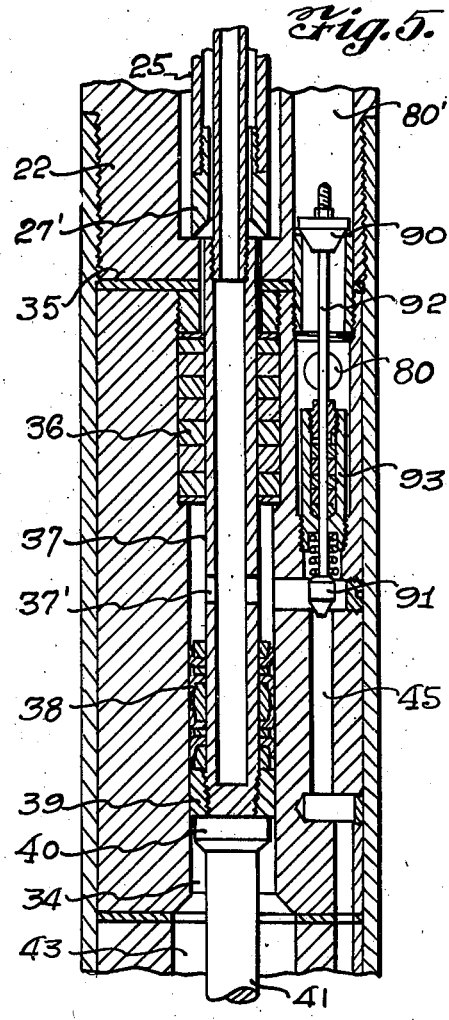
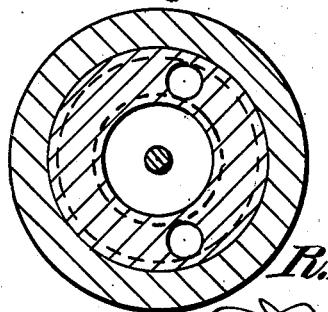

Dec. 30, 1941. R. P. GRAYSON 2,267,910
POWER PRODUCING APPARATUS
Filed Nov. 25, 1939 5 Sheets-Sheet 3
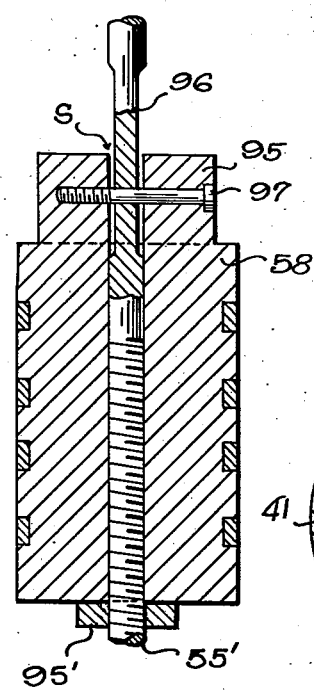
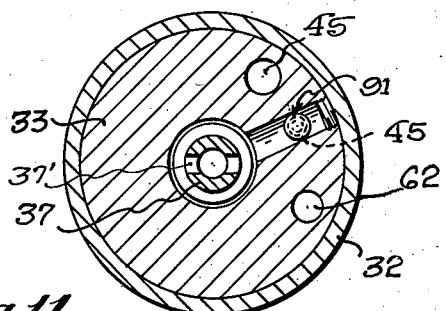
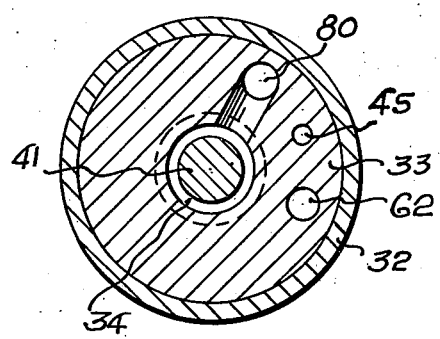
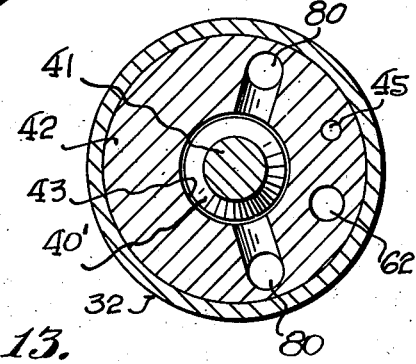
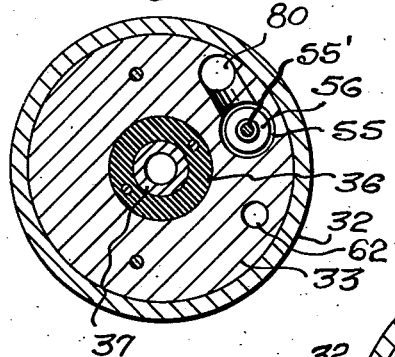
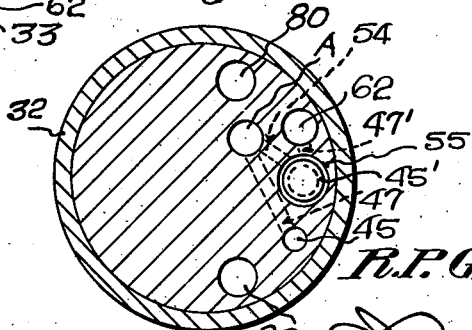
R. P. Grayson
INVENTOR.
BY
ATTORNEY.

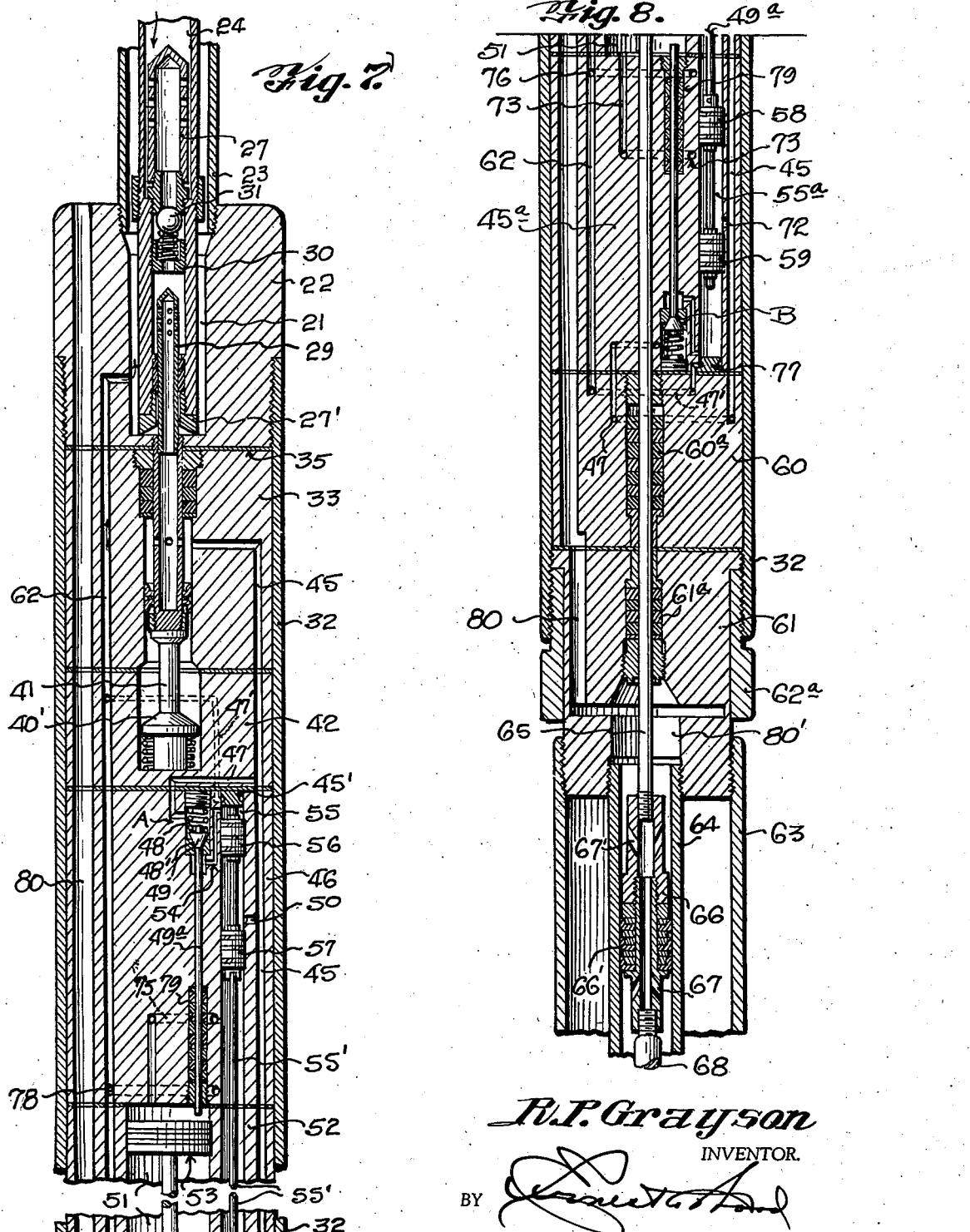
Dec. 30, 1941. R. P. GRAYSON 2,267,910
POWER PRODUCING APPARATUS
Filed Nov. 25, 1939 5 Sheets-Sheet 4
R. P. Grayson
INVENTOR.
BY
ATTORNEY.

Dec. 30, 1941.  R. P. GRAYSON  2,267,910
POWER PRODUCING APPARATUS
Filed Nov. 25, 1939  5 Sheets-Sheet 5

R. P. Grayson
INVENTOR.
BY
ATTORNEY

Patented Dec. 30, 1941

2,267,910

UNITED STATES PATENT OFFICE 2,267,910

POWER PRODUCING APPARATUS

Ralph P. Grayson, Brooklyn, N. Y.

Application November 25, 1939, Serial No. 306,053

2 Claims. (Cl. 121—157)

This invention relates to new and useful improvements in power producing apparatus and more particularly to an apparatus for lifting well fluids through the medium of gas pressure originating at the surface and applied to operate the movable elements of apparatus in the well and is a continuation in part of the invention described in application filed February 10, 1939, Serial Number 255,658.

One object of this invention is to provide means functioning as a governor to control the movements of the main piston in the event that the well fluid should for any reason fail to be discharged from the pump means thereby reducing materially the speed of the piston and consequently wear on the parts.

Another object of the invention is to provide an apparatus of this make which will operate in a well of any depth with equal efficiency with "dry" tubing or "dry" casing; with no possibility of mixing the operating fluid with the well fluid while the former is applied in operating the apparatus.

Still another object of the invention resides in the ease and readiness by which the parts of the apparatus can be assembled and especially is this feature important of the elements near the top of the assembly which are so related that in preparing the pressure tube for introducing the pressure medium into the pumping device, necessary manipulations of parts of the device can be effected without displacing any parts such as packing and the like.

A still further object of the invention is to provide for introduction into the pumping device a casing fluid should it be desired to swab the tubing prior to the introduction of the air line, preparatory to operating the apparatus.

Yet another object of the invention is to provide an apparatus of the nature set forth which may readily be adapted to any type of reciprocable well pump.

Another object of the invention is to provide for introducing the apparatus by means of tubing into a well with means for resisting influx of well fluid into the apparatus above a predetermined point as the latter is lowered into a well, inclined to flow, yet without interfering with the rise of the well fluid outside the tubing and which fluid is removed from the well by a lateral connection at the well casing head under control of a conventional oil saver.

Still another and important object of this invention is to provide means for maintaining a pressure differential between the well fluid and operating fluid to expedite exhaust of operating fluid into the column of oil into which the pumping device may be submerged. This means is effective in preventing locking or centering of the mechanism which would require that the device be withdrawn and reset for further operation.

A construction designed to carry out the invention will be hereinafter described together with other features of the invention.

The invention will be more readily understood from a reading of the following specification and by reference to the accompanying drawings, in which an example of the invention is shown, and wherein:

Figure 1 is a transverse vertical sectional view of the upper portion of a power producing apparatus constructed in accordance with the present invention being shown disposed within the casing of a well.

Figure 2 is a transverse vertical sectional view and forms a continuation in part of Figure 1.

Figure 3 is a view similar to Figure 2 and a continuation in part thereof.

Figure 4 is a transverse vertical sectional view of the lowermost end of the device which figure is a completion of Figure 3.

Figure 5 is a transverse vertical sectional view taken at approximately right angles to Figure 1 and being enlarged to disclose details of the governor.

Figure 6 is an enlarged detailed view in vertical section of the semi-swivel pistons.

Figures 7 and 8 are views in vertical section disclosing the complete apparatus set up as well as showing all high pressure operating fluid ports, all exhaust ports as well as the fluid discharge ports.

Figures 9, 10 and 11 are horizontal cross sectional views taken on their respective lines of Figure 1.

Figures 12 and 13 are horizontal cross sectional views taken on their respective lines of Figure 2.

Figure 14 is a horizontal cross sectional view taken on the line 14—14 of Figure 3.

Figure 15:
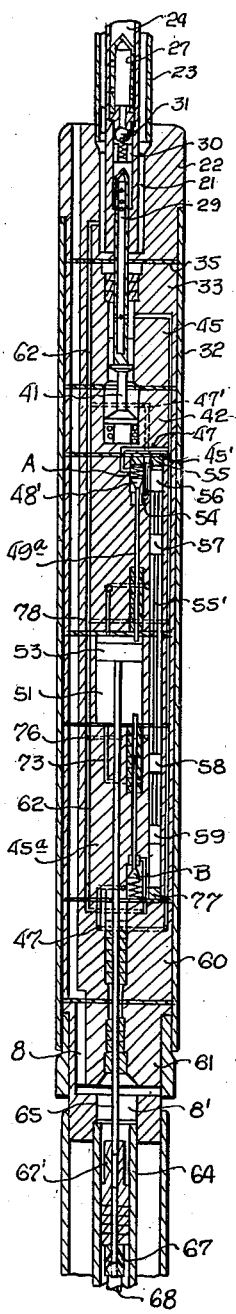
Figure 15 is a single schematic view of the complete layout of the invention.

In the drawings the numeral 20 designates the usual well casing having the power producing unit M comprising the present invention disposed therein. A head member 22 of the unit has an internally threaded axial opening in its upper end to receive the usual string of tubing 23. The macaroni string 24 is disposed within the tubing and is secured to a length of tubing 25 by means of a collar. The length of tubing 25 is internally threaded to receive a spacer 26 which spacer carries a perforated inlet 27 threadedly secured thereto. A threaded cap member 27' having an axial opening therein is secured to the lowermost end of the member 25 which member serves to compress a length of suitable packing 28 disposed within the member 25 whereby said cap acts as a packing gland which gland is arranged to pack off around a second perforated inlet 29 which is removably disposed within the length of tubing 25. Also disposed within the member 25 near its upper end is a retaining ring 30 which ring serves to confine a coiled spring in such a manner that said spring tends to exert an upward pressure against a ball valve 31 to seat said ball upon a seat formed in the lowermost end of the spacer member 26. The purpose of this valve is to prevent a back flow of the incoming pressure medium. A cylindrical jacket 32 is threadedly secured to the lowermost end of the head member 22 and depends downwardly therefrom, which jacket is arranged to confine the greater portion of the apparatus.

A cylindrical member 33 having an axial bore 34 therein is confined within the jacket immediately below the head member 22 being separated therefrom by a gasket 35. The upper end of the bore 34 is slightly enlarged and threaded at its extreme upper end whereby suitable packing rings 36 may be retained within the enlarged portion of the bore 34 by means of a follower 36' threadedly secured to form a stuffing box around a pipe 37 extending upwardly through the packing rings 36 and follower 36' and being secured to the lowermost end of the inlet 29 which inlet extends downwardly through the cap member 27'. Conventional pump cups 38, preferably constructed of leather, are arranged around the member 37 and contact the walls of the bore 34 for the purpose of separating the incoming pressure medium from the well fluid being pumped. The lowermost end of the member 37 is closed and externally threaded to receive a stop 39 arranged to retain the cups 38 upon the member 37. Horizontal ports 37' are provided in the walls of the member 37 to provide an outlet for pressure medium introduced into the member 37 by means of a surface compressor (not shown).

A valve member 40 is provided and comprises a stem 41 having its upper end slightly enlarged and contacting the keeper member 39. The stem projects downwardly into a member 42 disposed immediately below the member 33 and separated therefrom by a suitable gasket 42'. A valve head 40' is formed integral with the stem near its lower end and in its raised position is arranged to contact a valve seat 40ª formed in the lowermost end of the bore 34 of the member 33. The valve head is arranged to be slidably retained within the bore 43 formed in the member 42.

After the device has been placed in the well by means of the tubing 23 the macaroni string which provides a pressure medium inlet is lowered within the tubing and which string carries therewith the member 25 and its accompanying parts including the packing 28. The lowermost end of the cap member 27' is beveled whereby it may easily be centered over the inlet 29 and lowered thereover until such time as the cap member rests upon a shoulder 21ª formed within the bore 21 of the head member 22. As pressure is introduced into the macaroni string this pressure enters the inlet 27 by means of the perforations and travels downwardly to unseat the ball 31 and pass therearound into the member 25. The pressure then enters the inlet 29 through the perforations therein and passes downwardly therethrough into the member 37 and outwardly into the bore 34 through the medium of the ports 37' provided in the member 37. Prior to this operation and immediately after the device has been set in the well by means of the tubing, coiled springs 44 serve to force the valve head and the parts secured to the upper end thereof upwardly until such time as the valve head is seated upon the seat 40ª to prevent well fluid from passing from the chamber 43 in the member 42 upwardly into the bore 34 of the member 33 and will hereinafter be explained. At such time as the member 25 is engaged over the inlet 29 the weight of the macaroni string is sufficient to compress the coiled spring 44 and force the valve head of the valve member 40 downwardly to the position shown in Figure 2, which is the operative position of the device.

It is believed that the device will be more readily understood after description of the flow of the pressure with reference to the Figures 7 and 8. Particular attention is called to the fact that showing of all ports is merely schematic in Figures 7 and 8 and the governor is eliminated therein and that the figures are provided only for the sake of clarity. The true disposition of all ports and the members operated by the pressure medium are disclosed in all other figures.

As has been explained the pressure medium originating through a compressor (not shown) disposed on the surface is introduced into the macaroni string 24, enters the inlet 27, passes around the ball valve 31 into the inlet 29 and enters the bore 34 of the member 33 through the medium of the ports 37' provided therein. The pressure is then conducted by means of a port 45 hereinafter called the high pressure inlet port to be transported downwardly through the member 33 and member 42 into a complementary continuation of the port 45 within a member 46. An auxiliary port 47 transfers a portion of the pressure medium into a chamber 48 formed in the member 46 which chamber is provided with a valve seat 48' disposed in its lower end. A valve 49 is arranged to be seated upon the valve seat 48' at all times by means of a coiled spring. The valve stem 49ª of the valve extends downwardly through the member 46 and projects a short distance into the main cylinder 51 provided in a member 52 disposed within the jacket and immediately below the member 46 and separated therefrom by a suitable gasket. At such time as the main piston 53 is raised a sufficient distance to strike the valve stem 49ª and raise the valve from its seat, the pressure medium is then permitted to pass from the high pressure inlet through the port 47 through the chamber 48 to by-pass the valve 49 and enter a passage 54 provided below the valve seat.

The pressure medium which by-passed the valve 49 and traveled through the passage 54 enters a cylinder 55 which cylinder carries tandem valves 56 and 57. A common valve stem 55' carries both of these valves and extends downwardly through the member 52 and terminates within a second cylinder 55ª and has located upon its lower end a pair of tandem valves 58 and 59 identical with the valves 56 and 57.

The pressure which entered the cylinder 55 through the medium of the passage 54 is sufficient to force the valve 56 downwardly which downward movement of this valve will transmit downward movement to the common stem 55' to force the other three valves secured to the stem an equal distance downwardly to that of the valve 56. Downward movement of the tandem valves will of course change their positions with respect to high pressure introduction port 50. The pressure medium within the cylinder 55 between a plug 45' and the valve 56 may find escape through the medium of an exhaust 47' provided near the upper end of said cylinder. The port 47' communicates with a main pressure exhaust port 62 which port terminates within the bore 21 of the head 22.

A second valve assembly is disposed within the lower end of a member 45$^a$ which member has formed therein the cylinder 55$^a$. This lower valve will hereinafter be designated as B while the upper valve shall be designated as A; both valves will bear like reference numerals throughout.

Disposed immediately below the member 45$^a$ is a member 60 having a stuffing box 60$^a$ axially disposed therein which member is immediately above the bottom section 61 of the device. This member 61 is of a smaller diameter than that of the members thereabove and is enlarged at its upper end and being externally threaded to be received within the extreme lower end of the jacket 32. A cap member 62$^a$ is externally screw-threaded and is slidably engaged over the member 61 and screw-threaded into the lower end of the jacket to positively prevent the member 61 from becoming disengaged from said jacket.

The extreme lower end of the member 61 is externally threaded to receive the upper end of the usual mud anchor 63. A piston rod 65 is secured to the bottom side of the main piston 53 which rod extends downwardly through the main cylinder 51, through the member 45$^a$, through the members 60 and 61 and terminates within the usual pump barrel 64. This barrel is externally threaded to be received within the extreme lower end of the member 61 which member contains a stuffing box 61$^a$, axially disposed within the upper end thereof. The extreme lower end of the piston rod 65 is secured to the upper end of a cross head 66 which head is provided with packing cups 66' contacting the inner periphery of the barrel whereby this head serves as a guide. Ports 67 are provided in the head immediately below the cups 66' while ports 67' are provided above said cups. Thus as fluid is being pumped and travels upwardly of the pump barrel, said fluid will enter port 67, pass internally through the cross head 66 and escape through the ports 67' above the cups. Thus the cups 66' do no pumping and serve only as a guide for the piston rod 65 and the upper end of a pump rod 68. Since the cups 66' do no pumping their period of usefulness is much greater. The lower rod carries the usual traveling valve 63$^a$ while the usual standing valve 69 is disposed within the extreme lower end of the pump barrel in the usual manner. The guide member or cross-head has considerable advantage in that in the event it is necessary or desirable to replace the pump rod 68 or the pump barrel, with one of greater or lesser diameter, it is not necessary to replace any other part.

A packer 70 serves to pack off the casing around the anchor to prevent the upward travel of well fluid thereby. Perforations 71 are provided in the wall of the mud anchor 63 whereby fluid may enter therein to be pumped as will hereinafter be explained.

In the operation of this device the motor, including all parts enclosed within the jacket 32 as well as the pump barrel of the mud anchor, is lowered into the well by the tubing. The packer is then set at the desired level, which of course is such level that the fluid within the well is capable of entering the anchor through the ports 71 therein. The macaroni string 24 and its accompanying parts secured thereto is then lowered into the well to the position shown in Figure 7. With all parts of the device in the position shown in Figures 7 and 8, the pressure medium is introduced as has been explained and enters from the high pressure inlet 45 into the cylinder 55 through the medium of the port 50. The high pressure medium at this time is confined between the valves 56 and 57 to produce equalized pressure upon each valve and being incapable of movement either way. Continued introduction of a pressure medium will introduce said medium into the cylinder 55$^a$ formed in the member 45$^a$ through the medium of a port 72. The pressure medium will be confined between the valves 58 and 59 and will find outlet from the cylinder 55$^a$ through a port 73 to be introduced therefrom into the main cylinder 51 on the underside of the main piston 53 thereby forcing the same upwardly.

Continued upward movement of this piston will force the piston to strike the valve stem 49$^a$ of the upper valve assembly A to raise the valve 49 off seat 48' to allow pressure medium to be introduced by the valve into the cylinder 55 immediately above the valve 56 as has been hereinbefore explained. Introduction of a pressure medium at this point will change the position of all valves relative to the ports 50 and 72. As the valve 58 moves downwardly it will serve to close the port 73 and prohibit the pressure medium from entering therein and thus an equalized pressure will be maintained between the valves 58 and 59 while downward movement of the valve 57 will serve to open a port 75. This port will transfer the pressure medium from the cylinder 55 into the upper end of the main cylinder 51 to exert pressure on the top side of the main piston 53. As the main piston is lowered, the pressure medium therebelow that had raised the main piston will be exhausted from the cylinder through the port 73 into the cylinder 55$^a$ immediately above the valve 58. The pressure medium will then find escape from the cylinder 55$^a$ to the main exhaust 62 through 76.

At such time as the piston is forced downwardly to strike the valve stem 49$a$ of the lower valve assembly B the lower valve 49 will be forced from its seat to allow pressure medium to by-pass said valve and enter the cylinder 55$a$ between the valve 59 and lower plug member 77 to raise the valve 59 as well as the valves 56 and 57 and 58 secured to the valve stem 55'. This operation will again put the parts in the position shown in Figures 7 and 8 thus completing one cycle of the motor. It is to be noted that upward travel of the valve 56 will force the pressure medium outwardly through the exhaust 47' to the main exhaust 62. The pressure medium from the main cylinder 51 will find exhaust during the upward travel of the piston 53 through the medium of the port 75 to the cylinder 55 and outwardly through an exhaust port 78. Attention is called to the fact that both the upper and lower valve stems 49a of the valve assemblies A and B pass through stuffing boxes 79.

The plug members 45' and 77 are so formed as to provide strainers for the exhaust of the pressure medium above the valve 56 within the cylinder 55 and below the valve 59 within the cylinder 55a. The outer portion of these plugs are screw-threaded to be received within their respective cylinders and their inner ends are of a slightly reduced outer diameter than the inner diameter of said cylinders whereby the pressure medium may pass therebetween and exhaust through ports 47'. The construction of plugs 45' and 77 is such that the output of pressure is restricted to afford a cushion for absorbing any shocks which valves 56 and 59 might otherwise be subjected to and yet prevents the passage of any foreign particles likely to clog the restricted ports.

From the foregoing it may be seen that the pressure medium is introduced through the macaroni string into the port 45 then through the ports 47 of both the upper and lower valve assemblies A and B.

Then depending upon the position of the tandem valves, the pressure medium will be introduced either above or below the main piston 53 within the cylinder 51 to reciprocate the same.

As this piston is reciprocated the traveling valve will also be moved in a complementary motion, due to the connection therebetween, through the medium of the piston rod 65 and pump rod 68 having the cross head 66 therebetween. The well fluid will be pumped by the standing valve and traveling valve in the usual manner and will internally by-pass the cross head carrying the guide cups 66' through the medium of the ports 67 and 67' formed in said cross head. The fluid will then enter the member 61 and will be forced through a main fluid discharge port 80 communicating with a chamber 80' formed in the lower end of the member 61. Upward passage of the fluid through the member 61 will be prohibited by the stuffing box 61a in the upper end thereof. The fluid will discharge through the port 80 successively through the members 61, 60, 45a, 52, 46, 42, 33 and 21 to find outlet into the well casing outside of the tubing 23 and above the packer 70 and thence to the surface to be discharged in the usual manner through a conventional casing head (not shown). The pressure medium as has been explained will exhaust through the port 62 and into the chamber 21 formed in the head 22 and exhaust upwardly through the tubing exteriorly of the macaroni string while, as has been stated, the pressure medium is introduced downwardly through the macaroni string. The traveling of fluid and pressure medium is clearly indicated by arrows in Figures 7 and 8. It is to be noted that one or more fluid discharge ports may be provided to attain the desired volume which volume will depend entirely upon the size of the pump barrel employed.

By observing Figures 5, 9 and 10, the details of the governor control valve may clearly be seen. The governor mechanism is disposed within the upper end of the member 33 and projects upwardly into the bottom of the head 22 and is comprised of an upper fluid valve 90 and a lower pressure medium valve 91 being secured together by a common valve stem 92. The stem passes through a stuffing box 93 disposed intermediate the upper and lower valves. The fluid discharge port 80 enters the governor above the stuffing box 93 and the pressure of this fluid serves to unseat the valve 90 to allow fluid to pass thereby and simultaneously raises the valve 91 clear of the high pressure inlet port 45 to allow a greater amount of pressure medium to pass therein. By observing Figure 5 it may be seen that when the valve 90 is seated, the valve 91 has a slight clearance above its seat in the high pressure inlet port 45 thereby allowing a smaller amount of pressure medium therethrough to operate the motor piston at a reduced speed. At such time as fluid enters the governor above the stuffing box 93 to raise the valve 90 as well as the valve 91, the input of the pressure medium is increased to speed the action of the motor piston thereby increasing the quantity of well fluid pumped.

By observing Figures 2, 3, 7 and 8 it may be seen that the common valve stem 55' is rather long and therefore in the event that the cylinders 55 and 55a are slightly out of line with each other in the assembly of this device, this rod would tend to be kinked and in time crystallized to render the device inoperative until the rod 55' has been replaced. To reduce the possibility of this happening the valves 57 and 58 are especially formed. The construction of these valves may clearly be seen by observing Figure 6. The valve is threaded upon the rod 55' approximately half the length of said valve while a reduced integral boss 95 is provided on one end thereof while the assembly is retained in a predetermined position by means of a lock nut 95' at the end opposite the boss. The boss has a groove formed therein extending the complete diameter thereof while a portion of the rod 55' is flattened and thereby reduced as at 96 whereby a space S is provided between the stem 55' and the groove. A retaining pin 97 extends through the boss at right angles to the groove then passes through the stem 55' whereby a semi-swivel connection is had which connection will at no time exert an undesirable pressure upon the piston and will serve to reduce the possibility of crystallization of the rod of the stem 55'. The other valve is formed in the same way but the rod is reduced or flattened at right angles to the flattened portion 96 shown in Figure 6 whereby a second semi-swivel connection is formed and with the two connections a complete swivel is had. Thus it may be seen that if the valve shown in Figure 6 be the valve 58 the flattened portion entering the bottom of the valve 57 to be at right angles to the flattened portion shown in Figure 6.

From the foregoing it may be seen that a power producing apparatus for pumping well fluids is had which unit employs a minimum number of parts to accomplish its object thereby reducing not only the cost of the upkeep of said unit but also in no way interfering with the efficiency thereof. Further the structure hereinbefore described will handle any desirable amount of well fluid being pumped and said action will require a minimum amount of input pressure thereby increasing the efficiency of said pump. Further in the event that for some reason the pump fails to raise the fluid therethrough, the governor control valve will reduce the speed of said pump to reduce the possibility of breakage thereof as well as undesirable wear on the parts as the speed of the unit would be greatly increased if the load thereon were to be for any reason reduced.

Manifestly, the construction as shown and described is capable of some modification and such modification as may be construed within the scope and meaning of the appended claims is also considered to be within the spirit and intent of the invention.

What is claimed is:

1. A fluid motor for well pumps comprising an elongated body of jacketed sections arranged for suspension in a well, an inlet passage for motive fluid, a back pressure prevention valve therein, a power cylinder in alinement with said fluid inlet passage, a piston in said cylinder, a load carrying piston rod, an elongated cylinder parallel with said power cylinder effecting communication between said fluid inlet passage and power cylinder, pairs of relatively spaced pistons in said elongated cylinder mounted on a common stem, annularly recessed plugs disposed in either end of said elongated cylinder for straining fluid in its emergence from said cylinder and to cushion the movements of said pistons, spring controlled valves disposed in chambers adjacent the ends of said power cylinder having stems extending thereinto for alternate engagement by the piston therein, means operative alternate upon engagement of said latter piston with said valve stems to actuate said pairs of pistons to admit motive fluid from said inlet passage to said power cylinder to operate the piston therein and means to exhaust said motive fluid at each stroke of said piston.

2. A fluid operated motor for well pumps comprising a jacketed, sectional body having a motive fluid inlet, a power cylinder, a load carrying piston therein, an elongated cylinder parallel with said power cylinder, a series of pistons in said elongated cylinder, fluid passages effecting communication between said fluid inlet and power cylinder and controlled by said pistons, a spring loaded valve disposed adjacent either end of said power cylinder, a stem for each valve entering said cylinder for alternate engagement by the piston therein to actuate said valves, thereby to determine the movement of said fluid controlling pistons, means disposed at either end of said elongated cylinder for straining motive fluid during its emergence therefrom and for cushioning the movements of the pistons therein and means for exhausting fluid from said power cylinder at each stroke of its piston.

RALPH P. GRAYSON.